(12) United States Patent
Olmsted et al.

(10) Patent No.: US 9,165,260 B1
(45) Date of Patent: Oct. 20, 2015

(54) METHOD AND APPARATUS FOR USING ESTIMATED TRAVEL TIME TO SCHEDULE AN EVENT AND EVENT REMINDERS

(75) Inventors: Gary Olmsted, Ashby, MA (US); John R. Klein, Dracut, MA (US)

(73) Assignee: AVAYA INC., Basking Ridge, NJ (US)

( * ) Notice: Subject to any disclaimer, the term of this patent is extended or adjusted under 35 U.S.C. 154(b) by 2634 days.

(21) Appl. No.: 11/509,340

(22) Filed: Aug. 24, 2006

(51) Int. Cl.
*G06Q 10/00* (2012.01)

(52) U.S. Cl.
CPC ..................... *G06Q 10/00* (2013.01)

(58) Field of Classification Search
CPC ....................................................... G06Q 10/00
USPC ....................................................... 705/9, 7.18
See application file for complete search history.

(56) References Cited

U.S. PATENT DOCUMENTS

| | | | |
|---|---|---|---|
| 5,790,974 A * | 8/1998 | Tognazzini ................. 455/456.5 |
| 6,834,195 B2 * | 12/2004 | Brandenberg et al. ..... 455/456.3 |
| 7,082,402 B2 * | 7/2006 | Conmy et al. ..................... 705/8 |
| 7,174,301 B2 * | 2/2007 | Florance et al. ............... 705/313 |
| 7,590,553 B2 * | 9/2009 | Coates et al. ....................... 705/8 |
| 2005/0043060 A1 * | 2/2005 | Brandenberg et al. ......... 455/558 |
| 2005/0119927 A1 * | 6/2005 | Patel .................................. 705/8 |
| 2007/0118415 A1 * | 5/2007 | Chen et al. ......................... 705/8 |

* cited by examiner

*Primary Examiner* — Romain Jeanty
(74) *Attorney, Agent, or Firm* — Anderson Gorecki & Rouille LLP

(57) ABSTRACT

A method, apparatus and computer program product for using estimated travel time to schedule an event and/or an event reminder is presented. At least one scheduled event participant is determined, as is a location of the at least one scheduled event participant. A travel time of at least one scheduled event participant to travel to the scheduled event is computed. An event is scheduled for the at least one scheduled event participant, the scheduled event taking into account the computed travel time of the at least one scheduled event participant.

18 Claims, 5 Drawing Sheets

METHOD AND APPARATUS FOR USING ESTIMATED TRAVEL TIME TO SCHEDULE AN EVENT AND EVENT REMINDERS

BACKGROUND

People typically utilize a calendar software application to schedule events, such as meetings, appointments and the like. Software such as Microsoft Outlook™ can further provide functionality for scheduling meetings wherein users are electronically invited to a meeting, and their respective calendars updated accordingly. Additionally other devices can copy calendar data (meetings, etc.) onto their own calendar. This includes synchronizing a Personal Digital Assistant (PDA) or cell phone with a computer wherein the schedule of events is transferred to the other device (referred to as "synchronizing").

Another useful attribute of these type of calendar software applications is they provide the ability for a user to set reminders for scheduled events. The reminder can notify the user of a pending event, usually by providing a pop-up window, or other type of indicator. The user can define the time the reminder is sent to the user. For example, the user can set a reminder to notify the user of a scheduled event fifteen minutes before the scheduled event is to take place.

SUMMARY

Conventional mechanisms such as those explained above suffer from a variety of deficiencies. One such deficiency is that when a group of people, each at a different location, want to rendezvous at a particular place, selection of a meeting time requires many conversations to decide how long it will take each participant to reach the selected destination. The group could be a group of friends meeting for dinner, or a crisis response team meeting at a headquarters site. Even after a meeting time is negotiated, automobile traffic, weather conditions or road construction can result in delays in a participant arriving.

A user of a calendar software application such as Microsoft Outlook can set a reminder to notify him of an upcoming appointment, but the reminder occurs at a pre-selected fixed time prior to the start of the appointment. If the appointment requires driving to arrive, the travel time can be affected by traffic or construction en route.

When people are trying to manually schedule an appointment in their calendar software application, a decision is made regarding the advertised availability when the user has an offsite appointment around where they want to schedule around another appointment. If the user puts in the actual appointment time (and is reminded accurately), then the other party only sees when the user is available at the time the appointment is starting. If the user compensates for the time to travel, then reminders can't be used, and the user doesn't necessarily know when exactly the appointment is.

There are various existing technologies that can be manually invoked to solve parts of this problem. Location of a participant (via GPS or other means), mapping and routing software (such as MapQuest™) to generate a list of directions between the current location and the destination, and traffic service providers (such as SmartTraveller™) which provide real time traffic and construction information.

The proposed system automates the travel time determination for participants of a scheduled event. Automatic monitoring of travel time for one or many event participants is provided and this information is used to efficiently schedule a future event or to dynamically schedule a reminder for a future event.

In a particular embodiment of a method for providing estimated travel time to schedule an event, the method includes determining at least one scheduled event participant and determining a location of the at least one scheduled event participant. The method further includes computing a travel time of at least one scheduled event participant to travel to the scheduled event. The method further includes scheduling a scheduled event for the at least one scheduled event participant, the scheduling taking into account the computed travel time of the at least one scheduled event participant.

In another embodiment, the method involves using estimated travel time to schedule an event reminder. The method includes determining at least one scheduled event participant and determining a location of the at least one scheduled event participant. The method further includes computing a travel time of at least one scheduled event participant to travel to the scheduled event. Additionally, the method includes scheduling a reminder for the at least one scheduled event participant, the scheduling taking into account the computed travel time of the at least one scheduled event participant.

Other embodiments include a computer readable medium having computer readable code thereon for providing a method of using estimated travel time to schedule an event. The medium includes instructions for determining at least one scheduled event participant and instructions for determining a location of the at least one scheduled event participant. The computer readable medium further includes instructions for computing a travel time of at least one scheduled event participant to travel to the scheduled event. The computer readable medium additionally includes instructions for scheduling a scheduled event for the at least one scheduled event participant, the scheduling taking into account the computed travel time of the at least one scheduled event participant.

Another embodiment includes a computer readable medium having computer readable code thereon for providing a method of using estimated travel time to schedule a reminder. The medium includes instructions for determining at least one scheduled event participant and instructions for determining a location of the at least one scheduled event participant. The computer readable medium further includes instructions for computing a travel time of at least one scheduled event participant to travel to the scheduled event. The computer readable medium additionally includes instructions for scheduling a reminder for the at least one scheduled event participant, the reminder taking into account the computed travel time of the at least one scheduled event participant.

Still other embodiments include a computerized device (scheduler), configured to process all the method operations disclosed herein as embodiments of the invention. In such embodiments, the computerized device includes a memory system, a processor, communications interface in an interconnection mechanism connecting these components. The memory system is encoded with a process that provides a method of using estimated travel time to schedule an event as explained herein that when performed (e.g. when executing) on the processor, operates as explained herein within the computerized device to perform all of the method embodiments and operations explained herein as embodiments of the invention. Thus any computerized device that performs or is programmed to perform up processing explained herein is an embodiment of the invention.

Other arrangements of embodiments of the invention that are disclosed herein include software programs to perform the method embodiment steps and operations summarized above and disclosed in detail below. More particularly, a computer program product is one embodiment that has a computer-readable medium including computer program logic encoded thereon that when performed in a computerized device provides associated operations providing a method of using estimated travel time to schedule an event an as explained herein. The computer program logic, when executed on at least one processor with a computing system, causes the processor to perform the operations (e.g., the methods) indicated herein as embodiments of the invention. Such arrangements of the invention are typically provided as software, code and/or other data structures arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC) or as downloadable software images in one or more modules, shared libraries, etc. The software or firmware or other such configurations can be installed onto a computerized device to cause one or more processors in the computerized device to perform the techniques explained herein as embodiments of the invention. Software processes that operate in a collection of computerized devices, such as in a group of data communications devices or other entities can also provide the system of the invention. The system of the invention can be distributed between many software processes on several data communications devices, or all processes could run on a small set of dedicated computers, or on one computer alone.

It is to be understood that the embodiments of the invention can be embodied strictly as a software program, as software and hardware, or as hardware and/or circuitry alone, such as within a data communications device. The features of the invention, as explained herein, may be employed in data communications devices and/or software systems for such devices such as those manufactured by Avaya Corp. of Lincroft, N.J.

BRIEF DESCRIPTION OF THE DRAWINGS

The foregoing will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Figure 1:
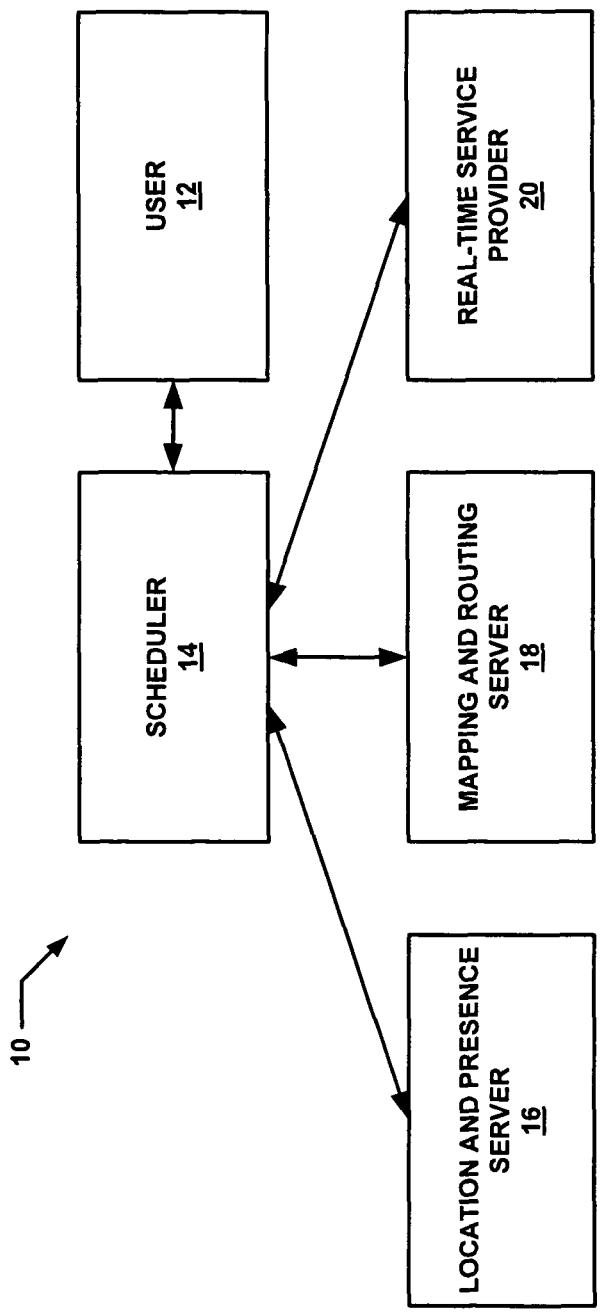
FIG. 1 comprises a block diagram of a system for using estimated travel time to schedule an event and event reminders.

Referring to FIG. 1, a system 10 for using estimated travel time to schedule events and/or event reminders is shown. The system 10 includes a scheduler 14 which is in communication with a user 12. Also shown is a location and presence server 16, a mapping and routing sever 18, and a real-time service provider 20. The presence server 16 is used to provide information regarding the presence of the scheduled event participant. This may be a static address of the scheduled event participant or a GPS service to provide the location of the scheduled event participant. The mapping and routing server 18 can be realized as a service such as Mapquest™ which can produce a preferred route and estimated travel time for the participant to travel from his location to the scheduled event. The real-time service provider 20 is used to provide updates and information relating to real-time events which may affect the travel time of the scheduled event participant. This may include, but are not limited to, traffic conditions, road repairs, weather conditions, or other events (such as a concert getting out) which may impact the travel time of the scheduled event participant.

In one embodiment the system 10 provides a core service that estimates the travel time between a participant and a destination, uses mapping software to define a route, and accesses a real-time traffic and construction service to account for delays. The core service can be invoked in several contexts. In a particular embodiment the core service can be invoked by a meeting scheduler such as Microsoft Outlook™ when a meeting between remote participants is created. The scheduler uses the location of the meeting and the locations of the participants to select a meeting time based on travel time considerations. The scheduler determines the current location of the participants based on static address information or via a dynamic presence and location service.

The core service may also be invoked periodically by an individual's calendar software application (a program such as Microsoft Outlook™) to compute the travel time required for an appointment at another location, and trigger a reminder for the appointment based on the current travel time (including traffic and construction considerations). The calendar software application would determine current location based on the location of the user's current appointment, or by using a dynamic presence and location service.

The core service could also be manually invoked during the presentation of other person's availability (in a program such as Microsoft Outlook) to gather the estimated travel times on each "side" of the attendee's appointments and show that time as "Tentative" or "Travel". This would allow the person scheduling to understand why that time is unavailable (or ill-advised) for scheduling into.

Figure 2A:
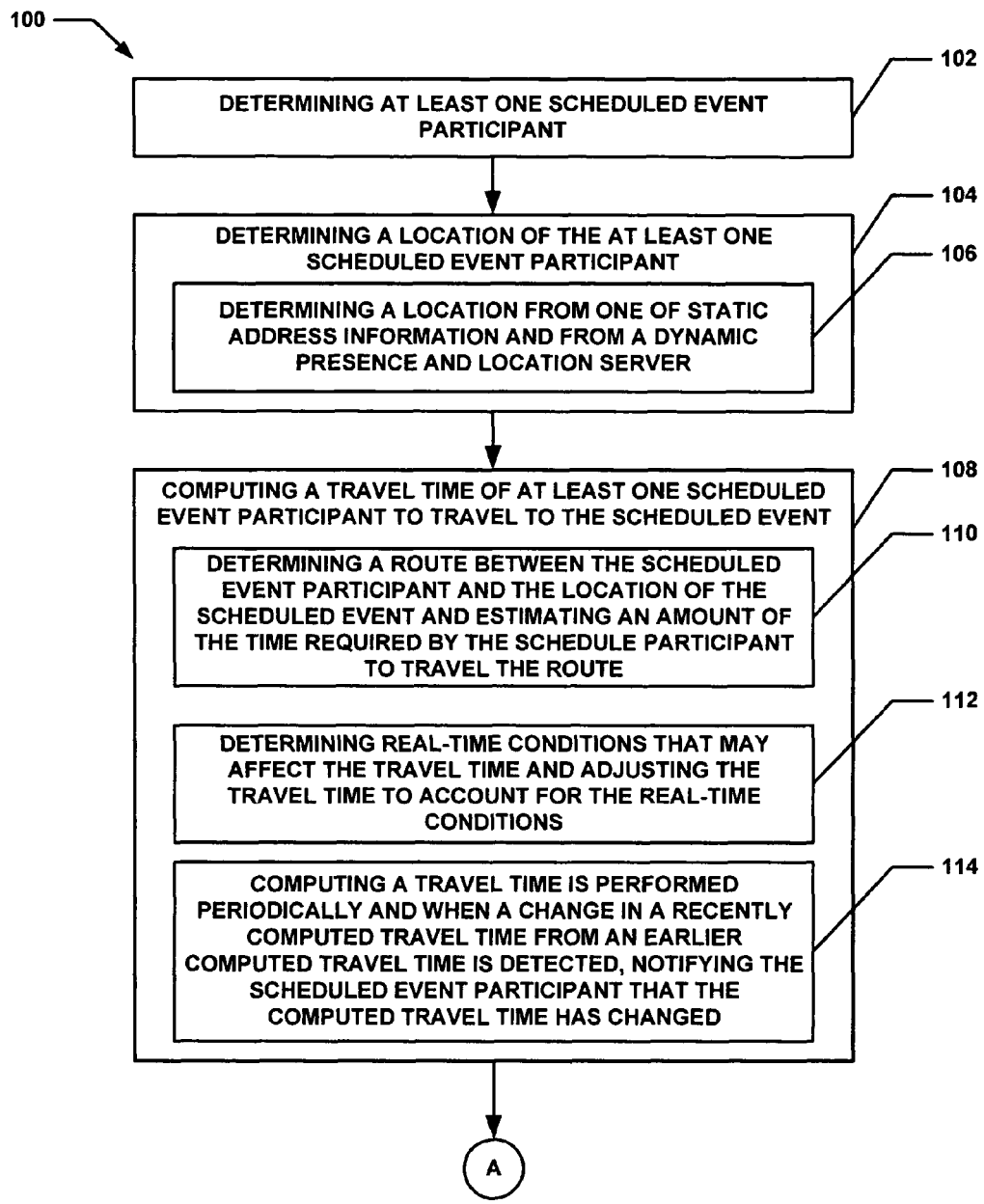
FIGS. 2A and 2B depict a flow diagram of a method for using estimated travel time to schedule an event and event reminders.
Figure 2B:
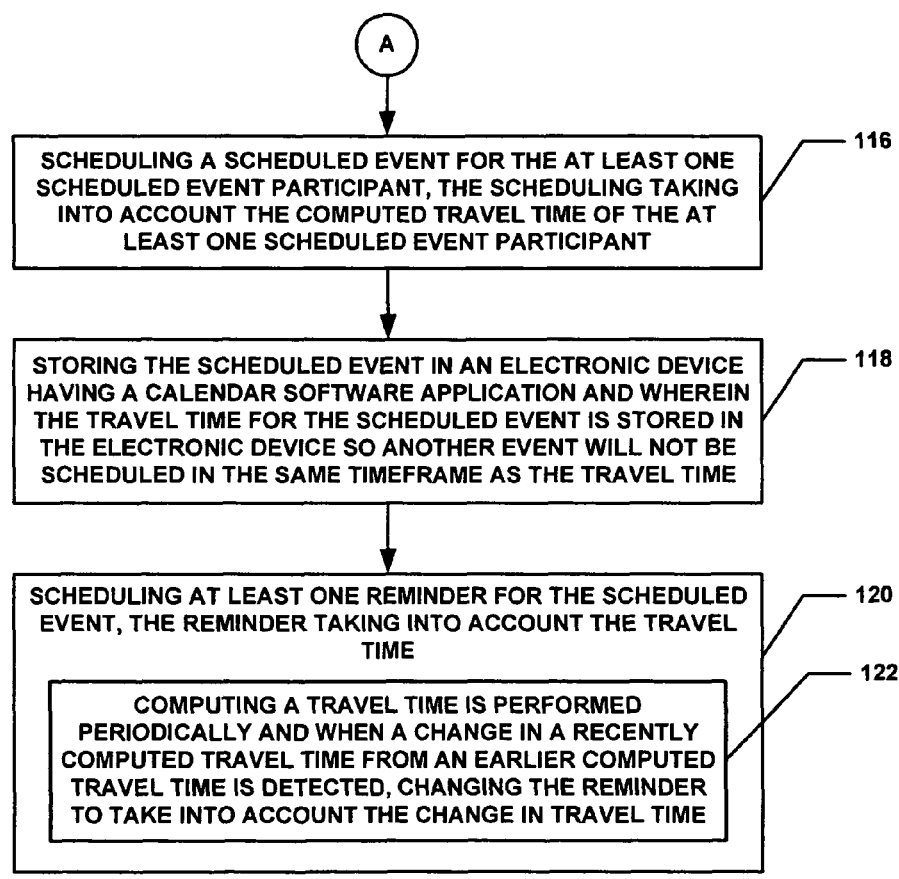
Figure 3:
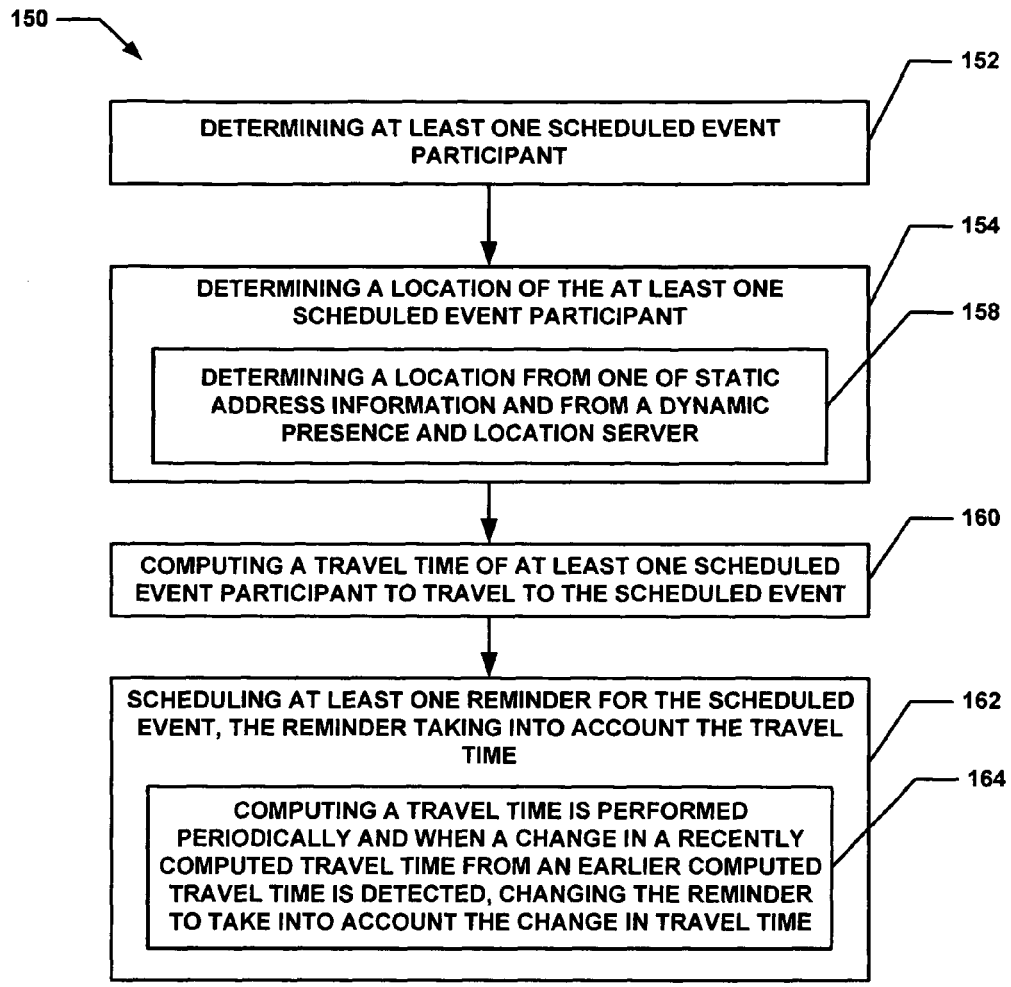
FIG. 3 depicts a flow diagram of a method for using estimated travel time to schedule event reminders.

Flow charts of the presently disclosed methods are depicted in FIGS. 2A-2B and 3. The rectangular elements are herein denoted "processing blocks" and represent computer software instructions or groups of instructions. Alternatively, the processing blocks represent steps performed by functionally equivalent circuits such as a digital signal processor circuit or an application specific integrated circuit (ASIC). The flow diagrams do not depict the syntax of any particular programming language. Rather, the flow diagrams illustrate the functional information one of ordinary skill in the art requires to fabricate circuits or to generate computer software to perform the processing required in accordance with the present invention. It should be noted that many routine program elements, such as initialization of loops and variables and the use of temporary variables are not shown. It will be appreciated by those of ordinary skill in the art that unless otherwise indicated herein, the particular sequence of steps described is illustrative only and can be varied without departing from the spirit of the invention. Thus, unless otherwise stated the steps described below are unordered meaning that, when possible, the steps can be performed in any convenient or desirable order.

Referring now to FIGS. 2A and 2B, a particular embodiment of a method 100 of using estimated travel time to schedule an event is shown. The method begins with processing block 102 which discloses determining at least one scheduled event participant. The scheduled event participant would be the planned attendees for a business meeting, a group of friends having dinner together, or the like.

Processing block 104 states determining a location of the at least one scheduled event participant. As recited in processing block 106 determining a location comprises determining a location from one of static address information and from a dynamic presence and location server. The static address information could be a home address or business address, whereas the dynamic presence and location server could be a GPS system which can identify a location of a scheduled event participant.

Processing block 108 discloses computing a travel time of at least one scheduled event participant to travel to the scheduled event. This determination may include, as shown in processing block 110 determining a route between the scheduled event participant and the location of the scheduled event and estimating an amount of the time required by the schedule participant to travel the route. The computing of the travel time may further include, as recited in processing block 112, determining real-time conditions that may affect the travel time and adjusting the travel time to account for the real-time conditions. The real-time conditions could include weather conditions (e.g., a snow storm may cause the estimated travel time to increase), road construction which may result in a traffic jam which would also cause the estimated travel time to increase as would an occurrence of a traffic accident along the route. The real time conditions may also include other events such as a sporting event letting out which may affect the travel time since a traffic jam may result from the crowd exiting the sporting event. As further recites in processing block 114, the computing a travel time is performed periodically and when a change in a recently computed travel time from an earlier computed travel time is detected, the scheduled event participant is notified that the computed travel time has changed.

Processing continues with processing block 116 which recites scheduling a scheduled event for the at least one scheduled event participant, the scheduling taking into account the computed travel time of the at least one scheduled event participant. This provides a more efficient scheduling of events since the travel time of the participant(s) is used as a factor when scheduling is being performed.

Processing block 118 discloses storing said scheduled event in an electronic device having a calendar software application and wherein said travel time for the scheduled event is stored in said electronic device so another event will not be scheduled in the same timeframe as the travel time. The electronic device could be a computer, Personal Digital Assistant (PDA), cellular telephone or the like. Further, the travel time is also stored in the calendar software application (separate from the meeting time) so that the travel time isn't inadvertently utilized as part of another scheduled event. For example, if a meeting were at 10:00 a.m., lasts an hour, and the travel time is determined to be a half hour, the calendar software application may show the meeting time as being from 10:00 a.m. to 11:00 a.m. and the travel time as another entry from 9:30 a.m. to 10:00 a.m. This would prevent another event from being scheduled which would include the 9:30 to 10:00 timeframe and the 10:00 a.m. to 11:00 a.m. timeframe.

Processing block 120 states scheduling at least one reminder for the scheduled event, the reminder taking into account the travel time. Thus, not only does the event scheduling take into account the travel time, a reminder regarding the scheduled event also takes into account the travel time. Accordingly, a reminder may be scheduled wherein the reminder reminds the scheduled event participant prior to the travel time computed for a scheduled event. Using the example discussed above, a reminder for the 10:00 a.m. meeting may be scheduled to remind the scheduled event participant five minutes before the travel time. Thus, at 9:25 a.m. a reminder is provided to the scheduled event participant, so he/she can prepare for the meeting and the travel to the meeting. As recited in processing block 122, the computing a travel time is performed periodically and when a change in a recently computed travel time from an earlier computed travel time is detected, the time for the reminder is changed to take into account the change in travel time. Thus if conditions cause a change in the travel time, the reminder is also rescheduled to account for the change.

Referring now to FIG. 3, a particular embodiment of a method 150 of using estimated travel time to schedule a reminder for an event is shown. The method begins with processing block 152 which discloses determining at least one scheduled event participant. The scheduled event participant would be the planned attendees for a business meeting, or a group of friends having dinner together.

Processing block 154 states determining a location of the at least one scheduled event participant. As recited in processing block 156 determining a location comprises determining a location from one of static address information and from a dynamic presence and location server. The static address information could be a home address or business address, whereas the dynamic presence and location server could be a GPS system which can identify a location of a scheduled event participant.

Processing block 158 discloses computing a travel time of at least one scheduled event participant to travel to the scheduled event.

Processing block 160 states scheduling at least one reminder for the scheduled event, the reminder taking into account the travel time. A reminder may be scheduled wherein the reminder reminds the scheduled event participant prior to the travel time computed for a scheduled event. Using the example above, a reminder for the 10:00 a.m. meeting may be scheduled to remind the scheduled event participant five minutes before the travel time. Accordingly, at 9:25 a.m. a reminder is provided to the scheduled event participant, so he can prepare for the meeting and the travel to the meeting. As recited in processing block 162, the computing a travel time is performed periodically and when a change in a recently computed travel time from an earlier computed travel time is detected, changing the reminder to take into account the change in travel time. Thus if conditions cause a change in the travel time, the reminder is also rescheduled to account for the change.

Figure 4:
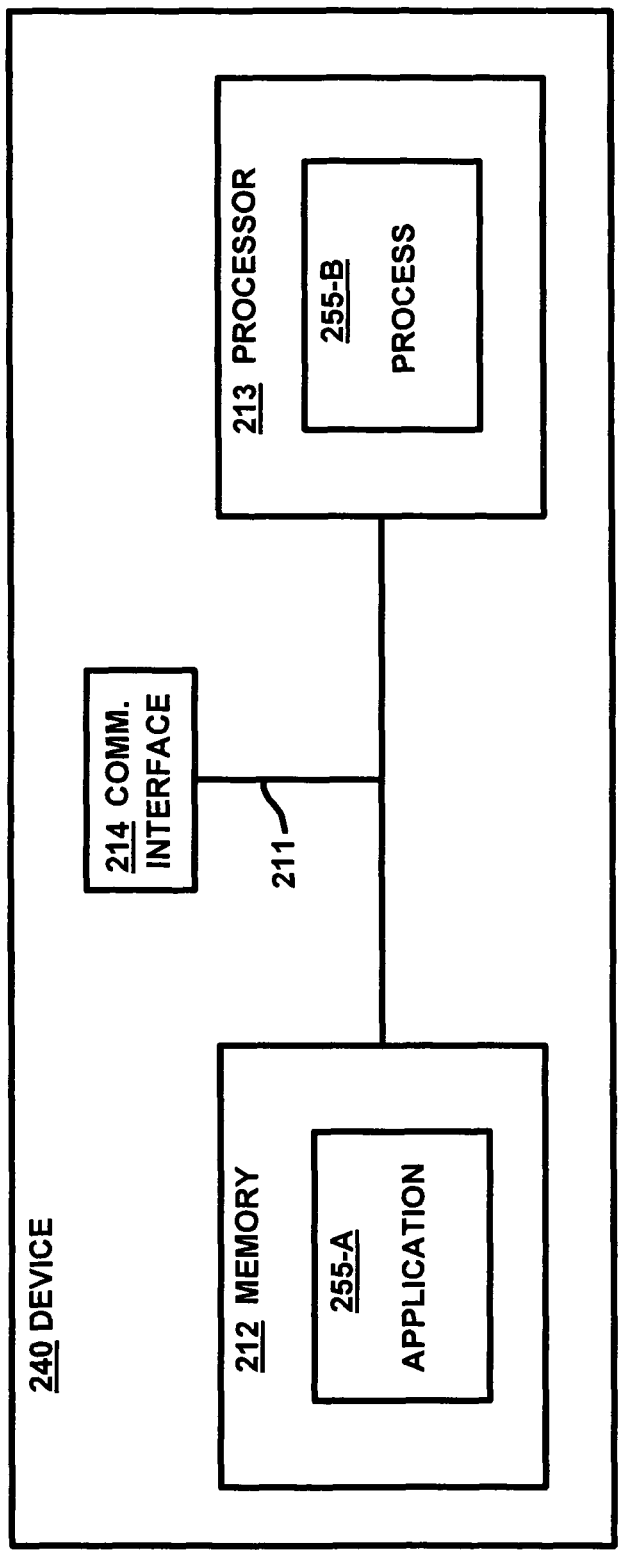
FIG. 4 illustrates an example computer system architecture for a scheduler that uses estimated travel time to schedule an event and event reminders in accordance with embodiments of the invention.

FIG. 4 illustrates example architectures of a computer system that is configured as a scheduler 240. The computer system 240 may be any type of computerized system such as a personal computer, workstation, portable computing device, mainframe, server or the like. In this example, the system includes an interconnection mechanism 211 that couples a memory system 212, a processor 213, and a communications interface 214. The communications interface 214 allows the computer system 240 to communicate with external devices or systems.

The memory system 212 may be any type of computer readable medium that is encoded with an application 255-A that represents software code such as data and/or logic instructions (e.g., stored in the memory or on another computer readable medium such as a disk) that embody the processing functionality of embodiments of the invention for the agent 255 as explained above. The processor 213 can access the memory system 212 via the interconnection mechanism 211 in order to launch, run, execute, interpret or otherwise perform the logic instructions of the applications 255-A in order to produce a corresponding process 255-B. In other words, the process 255-B represents one or more portions of the application 255-A performing within or upon the processor 213 in the computer system.

It is to be understood that embodiments of the invention include the applications (i.e., the un-executed or non-performing logic instructions and/or data) encoded within a computer readable medium such as a floppy disk, hard disk or in an optical medium, or in a memory type system such as in firmware, read only memory (ROM), or, as in this example, as executable code within the memory system 212 (e.g., within random access memory or RAM). It is also to be understood that other embodiments of the invention can provide the applications operating within the processor 213 as the processes. While not shown in this example, those skilled in the art will understand that the computer system may include other processes and/or software and hardware components, such as an operating system, which have been left out of this illustration for ease of description of the invention.

Having described preferred embodiments of the invention it will now become apparent to those of ordinary skill in the art that other embodiments incorporating these concepts may be used. Additionally, the software included as part of the invention may be embodied in a computer program product that includes a computer useable medium. For example, such a computer usable medium can include a readable memory device, such as a hard drive device, a CD-ROM, a DVD-ROM, or a computer diskette, having computer readable program code segments stored thereon. The computer readable medium can also include a communications link, either optical, wired, or wireless, having program code segments carried thereon as digital or analog signals. Accordingly, it is submitted that that the invention should not be limited to the described embodiments but rather should be limited only by the spirit and scope of the appended claims.

What is claimed is:

1. A computer implemented method of using estimated travel time to schedule an event, the method comprising:
    determining, by a computer system, at least one scheduled event participant;
    determining, by a computer system, a location of the at least one scheduled event participant;
    computing, by a computer system, a travel time of at least one scheduled event participant to travel to said scheduled event;
    scheduling, by a scheduler, a scheduled event for the at least one scheduled event participant, said scheduling taking into account the computed travel time of the at least one scheduled event participant;
    storing, by a said scheduler, said scheduled event in an electronic device having a calendar software application and wherein said travel time for the scheduled event is stored in said electronic device so another event will not be scheduled in the same timeframe as the travel time, and wherein the travel time for a scheduled event is stored as a calendar entry separate from a calendar entry of the scheduled event;
        wherein said computing a travel time is performed periodically and when a change in a recently computed travel time from an earlier computed travel time is detected, notifying the scheduled event participant that the computed travel time has changed; and
    wherein storing said scheduled event in an electronic device having a calendar software application includes:
        rendering a first calendar entry representative of scheduled event;
        rendering a second calendar entry representative of the travel time, wherein the second calendar entry is displayed by the calendar software application as visibly separate from the first calendar entry;
    wherein notifying the scheduled event participant that the computed travel time has changed includes:
        updating an appearance of the second calendar entry, wherein an updated second calendar entry is representative of a new computed travel time.

2. The method of claim 1 wherein said determining a location comprises determining a location from one of static address information and from a dynamic presence and location server.

3. The method of claim 1 wherein said computing a travel time comprises determining a route between the scheduled event participant and the location of the scheduled event and estimating an amount of the time required by the schedule participant to travel the route.

4. The method of claim 3 wherein said computing a travel time further comprises determining real-time conditions that may affect the travel time and adjusting the travel time to account for said real-time conditions.

5. The method of claim 1 further comprising scheduling at least one reminder for said scheduled event, said reminder taking into account the travel time.

6. The method of claim 5 wherein said computing a travel time is performed periodically and when a change in a recently computed travel time from an earlier computed travel time is detected, changing the reminder to take into account the change in travel time.

7. A computer implemented method of claim 1, wherein updating the appearance of the second calendar entry includes: maintaining an appearance of the first calendar entry.

8. A computer readable storage medium having computer readable code thereon for providing a method of using estimated travel time to schedule an event, method comprising:
    computer executable instructions for determining at least one scheduled event participant;
    computer executable instructions for determining a location of the at least one scheduled event participant;
    computer executable instructions for computing a travel time of at least one scheduled event participant to travel to said scheduled event;
    computer executable instructions for scheduling a scheduled event for the at least one scheduled event participant, said scheduling taking into account the computed travel time of the at least one scheduled event participant;
    computer executable instructions for storing said scheduled event in an electronic device having a calendar software application and wherein said travel time for the scheduled event is stored in said electronic device so another event will not be scheduled in the same timeframe as the travel time, wherein the travel time for a scheduled event is stored as a calendar entry separate from a calendar entry of the scheduled event;
    wherein said computing a travel time is performed periodically and when a change in a recently computed travel time from an earlier computed travel time is detected, notifying the scheduled event participant that the computed travel time has changed; and wherein storing said scheduled event in an electronic device having a calendar software application includes:
   rendering a first calendar entry representative of scheduled event;
   rendering a second calendar entry representative of the travel time, wherein the second calendar entry is displayed by the calendar software application as visibly separate from the first calendar entry;
wherein notifying the scheduled event participant that the computed travel time has changed includes:
updating an appearance of the second calendar entry, wherein an updated second calendar entry is representative of a new computed travel time.

9. The computer readable medium of claim 8 wherein said instructions for determining a location comprises instructions for determining a location from one of static address information and from a dynamic presence and location server.

10. The computer readable medium of claim 8 wherein said instructions for computing a travel time comprises instructions for determining a route between the scheduled event participant and the location of the scheduled event and estimating an amount of the time required by the schedule participant to travel the route.

11. The computer readable medium of claim 10 wherein said instructions for computing a travel time further comprises instructions for determining real-time conditions that may affect the travel time and adjusting the travel time to account for said real-time conditions.

12. The computer readable medium of claim 8 further comprising instructions for scheduling at least one reminder for said scheduled event, said reminder taking into account the travel time.

13. The computer readable medium of claim 12 wherein said instructions for computing a travel time is performed periodically and instructions for when a change in a recently computed travel time from an earlier computed travel time is detected, changing the reminder to take into account the change in travel time.

14. A scheduler comprising:
a memory;
a processor;
a communications interface;
an interconnection mechanism coupling the memory, the processor and the communications interface; and
wherein the memory is encoded with an application using estimated travel time to schedule an event that when performed on the processor, provides a process for processing information, the process causing the scheduler to be capable of performing the operations of:
determining at least one scheduled event participant;
determining a location of the at least one scheduled event participant;
computing a travel time of at least one scheduled event participant to travel to said scheduled event;
scheduling a scheduled event for the at least one scheduled event participant, said scheduling taking into account the computed travel time of the at least one scheduled event participant;
storing said scheduled event in an electronic device having a calendar software application and wherein said travel time for the scheduled event is stored in said electronic device so another event will not be scheduled in the same timeframe as the travel time, wherein the travel time for a scheduled event is stored as a calendar entry separate from a calendar entry of the scheduled event;
wherein said computing a travel time is performed periodically and when a change in a recently computed travel time from an earlier computed travel time is detected, notifying the scheduled event participant that the computed travel time has changed; and
wherein storing said scheduled event in an electronic device having a calendar software application includes:
   rendering a first calendar entry representative of scheduled event;
   rendering a second calendar entry representative of the travel time, wherein the second calendar entry is displayed by the calendar software application as visibly separate from the first calendar entry;
wherein notifying the scheduled event participant that the computed travel time has changed includes:
updating an appearance of the second calendar entry, wherein an updated second calendar entry is representative of a new computed travel time.

15. The scheduler of claim 14 wherein said determining a location comprises one of determining a location from one of static address information and a dynamic presence and location server.

16. The scheduler of claim 14 wherein said computing a travel time further comprises determining real-time conditions that may affect the travel time and adjusting the travel time to account for said real-time conditions.

17. The scheduler of claim 14 further comprising scheduling at least one reminder for said scheduled event, said reminder taking into account the travel time.

18. The scheduler of claim 14 wherein said computing a travel time is performed periodically and when a change in a recently computed travel time from an earlier computed travel time is detected, changing the reminder to take into account the change in travel time.

* * * * *